(12) United States Patent
Rajauria et al.

(10) Patent No.: US 10,650,850 B1
(45) Date of Patent: May 12, 2020

(54) HARD DISK DRIVE WITH WRITE GAP CONDUCTIVE STRUCTURE AND DUAL INDEPENDENT INTERFACE VOLTAGE CONTROL CIRCUITRY

(71) Applicant: Western Digital Technologies, Inc., San Jose, CA (US)

(72) Inventors: Sukumar Rajauria, San Jose, CA (US); Na Wang, San Jose, CA (US); Erhard Schreck, San Jose, CA (US); Qing Dai, San Jose, CA (US); John Thomas Contreras, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/437,270

(22) Filed: Jun. 11, 2019

Related U.S. Application Data (60) Provisional application No. 62/802,395, filed on Feb. 7, 2019.

(51) Int. Cl.
*G11B 5/48* (2006.01)
*G11B 5/11* (2006.01)

(52) U.S. Cl.
CPC .............. *G11B 5/4826* (2013.01); *G11B 5/11* (2013.01)

(58) Field of Classification Search
CPC ............ G11B 5/48; G11B 5/4826; G11B 5/11
USPC .............................................. 360/234–234.6
See application file for complete search history.

(56) References Cited

U.S. PATENT DOCUMENTS

| | | | |
|---|---|---|---|
| 7,321,476 B2 | 1/2008 | Baumgart et al. | |
| 8,049,984 B2 | 11/2011 | Contreras et al. | |
| 8,139,309 B2 | 3/2012 | Knigge et al. | |
| 8,570,684 B1 | 10/2013 | Contreras et al. | |
| 8,760,779 B2 | 6/2014 | Johns et al. | |
| 9,001,444 B1 | 4/2015 | Contreras et al. | |
| 9,202,484 B1 | 12/2015 | Watanabe et al. | |
| 9,437,222 B1 | 9/2016 | Okamura et al. | |
| 9,595,280 B2 | 3/2017 | Canchi et al. | |
| 10,424,323 B1* | 9/2019 | Contreras .............. | G11B 5/314 |

(Continued)

OTHER PUBLICATIONS

Murthy et al., "In-Situ Contact Potential Measurement in Hard Disk Drives Using Head Disk Interlace Voltage Control", ASME 2014 Conference on Information Storage and Processing Systems 2014 Conference on Information Storage and Processing Systems Santa Clara, California, USA, Jun. 23-24, 2014 Conference Sponsors: Information Storage and Processing Systems Division.

*Primary Examiner* — Allen T Cao
(74) *Attorney, Agent, or Firm* — Thomas R. Berthold (57) ABSTRACT

A hard disk drive has a gas-bearing slider supporting a write head with an electrically conductive structure, like a spin-torque oscillator (STO), in the write gap, and dual independent interface voltage control (IVC) circuitry coupled to elements on the slider. A first IVC circuitry provides a bias voltage to the slider body to assure substantially zero electrical potential between the slider body and the disk to minimize slider-disk contact and lubrication pick-up. A second IVC circuitry operates independently of the first IVC circuitry and provides a bias voltage to the electrically conductive structure region to assure a negative potential of the electrically conductive structure region relative to the disk to minimize degradation of the slider overcoat and thus oxidation of the electrically conductive structure.

14 Claims, 5 Drawing Sheets

(56) References Cited

U.S. PATENT DOCUMENTS

| | | | |
|---|---|---|---|
| 2011/0090586 A1 | 4/2011 | Tsuwako et al. | |
| 2013/0026977 A1* | 1/2013 | Pei | H02J 7/045 |
| | | | 320/107 |
| 2014/0177100 A1* | 6/2014 | Sugiyama | G11B 5/3116 |
| | | | 360/125.03 |
| 2014/0240871 A1 | 8/2014 | Canchi et al. | |

* cited by examiner

HARD DISK DRIVE WITH WRITE GAP CONDUCTIVE STRUCTURE AND DUAL INDEPENDENT INTERFACE VOLTAGE CONTROL CIRCUITRY

RELATED APPLICATION

This application claims priority from provisional application 62/802,395 filed Feb. 7, 2019.

BACKGROUND

Field of the Invention

Embodiments of the invention relate generally to an interface voltage control (IVC) system in a hard-disk drive (HDD), and more specifically to a IVC system in a HDD that has an electrically conductive structure, such as a spin-torque oscillator (STO), in the write gap.

DESCRIPTION OF THE RELATED ART

Magnetic recording HDDs use a read/write transducer or head mounted on a head carrier for reading and/or writing data to a recording layer on the disk. The head carrier is typically a gas-bearing slider attached to an actuator arm by a suspension and positioned very close to the disk surface by the suspension. There is typically a stack of disks in the HDD with a slider-suspension assembly associated with each disk surface in the stack.

The separation or spacing between the slider and the disk surface is called the fly height. The slider has a disk-facing gas-bearing surface (GBS) that causes the slider to ride on a cushion or bearing of gas, typically air or helium, generated by rotation of the disk. The slider is attached to a flexure on the suspension and the suspension includes a load beam that applies a load force to the slider to counteract the gas-bearing force while permitting the slider to "pitch" and "roll". The flying dynamics of the slider and thus the fly height are influenced by factors such as the rotation speed of the disk, the aerodynamic shape of the slider's GBS, the load force applied to the slider by the suspension, and the pitch and roll torques applied to the slider by the suspension.

HDDs may use thermal fly-height control (TFC) of the read/write heads. One type of TFC uses an electrically resistive heater located on the slider near the head. When current is applied to the heater, the heater expands and causes the head to expand and thus move closer to the disk surface. The head can be adjusted to different heights, depending on whether the drive is reading or writing. Also, the heater can maintain the head at the optimal fly-height even in the presence of the above-described factors, which would otherwise cause changes in the fly-height. The TFC heater must be accurately calibrated so that the head-disk spacing can be controlled, which typically requires urging the head toward the disk until contact is made ("touchdown") at which point the slider is urged away from the disk ("pull-back"). An embedded contact sensor (ECS), embedded in the slider near the read/write head, can be used to sense touchdown. The ECS comprises a metallic strip located at the slider GBS. The resistance of the ECS changes in response to temperature changes so the voltage across the ECS can be used to determine touchdown, when the slider temperature changes as it comes in close proximity to the disk.

IVC (Interface Voltage Control) is used to apply a voltage to the slider body, or to the disk. In some instances, IVC may be used to passivate the slider by encapsulating at least a portion of the slider body with a static electrical charge, which can help preserve the life of the slider and corresponding read/write head by protecting it from mechanical wear as well as from chemical oxidation. Further, in some instances IVC may be used to minimize the slider-disk potential differences. When the slider-disk potential is not cancelled completely, an attractive electrostatic force pulls the slider close to the disk, which may cause head-disk contact and/or lubrication pick-up by the slider from the disk.

SUMMARY

HDDs have been proposed that use a write head with an electrically conductive structure in the write gap between the write pole and the trailing shield wherein electrical current is directed through the write gap. The electrically conductive structure may be a single conductive layer or multilayer to facilitate switching the magnetization in the recording layer. The electrically conductive structure may alternatively be a spin-torque oscillator (STO). In one type of system using a STO, called microwave-assisted magnetic recording (MAMR), a high frequency oscillatory auxiliary magnetic field from a ferromagnetic free layer or field generation layer (FGL) in the STO is applied to the magnetic grains of the recording layer.

In embodiments of this invention it has been discovered that to minimize slider-disk contact and lubrication pick-up, the IVC should maintain the electrical potential between the slider body and the disk at zero volts. However, in HDDs with an electrically conductive structure like a STO in the write gap, it has been discovered that there should be a negative bias voltage at the STO region relative to the disk to minimize wear to the slider overcoat and thus oxidation of the STO.

For a complete understanding of the nature and advantages of the invention, reference should be made to the following detailed description taken together with the accompanying figures.

DETAILED DESCRIPTION

Figure 1:
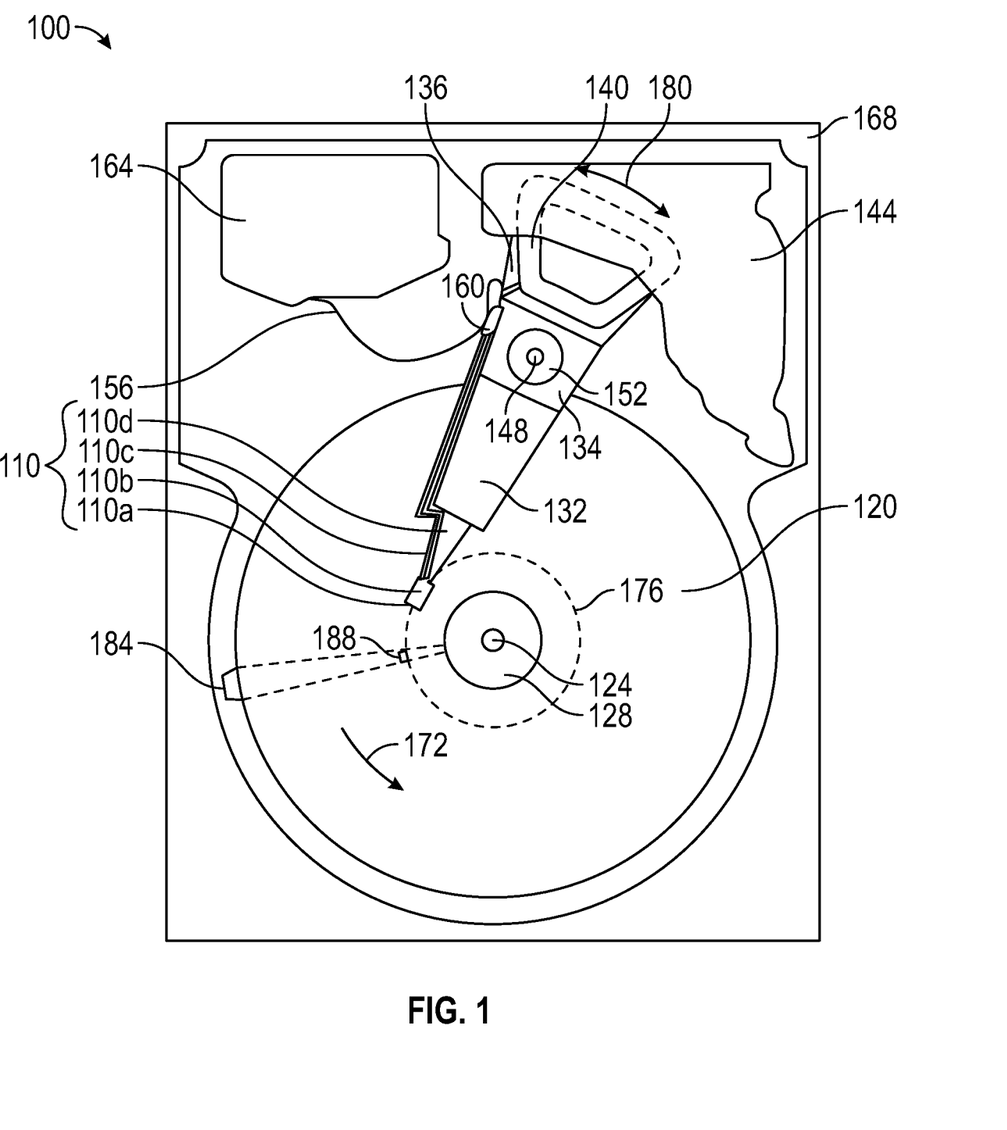
FIG. 1 is a schematic block diagram of a magnetic recording hard disk drive (HDD) according to embodiments of the invention.

A plan view illustrating an HDD 100 according to embodiments of the invention is shown in FIG. 1 to illustrate an exemplary operating environment.

The HDD 100 includes a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic recording medium or disk 120 rotatably mounted on a spindle 124 and a drive motor (not visible) attached to the spindle 124 for rotating the medium 120. The head 110a includes a write head or element and a read head or element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). An arm-electronics (AE) module 160, which may have an on-board pre-amplifier for the read signal, as well as other read-channel and write-channel electronic components, provides connection between the flex cable 156 and the head 110a. The AE module 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of gas that acts as an gas-bearing on which the gas-bearing surface (GBS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, a read/write integrated circuit (R/W IC), an arm electronics (AE) module, a motor driver, a servo processor, and other digital processors and associated memory. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

Figure 2:
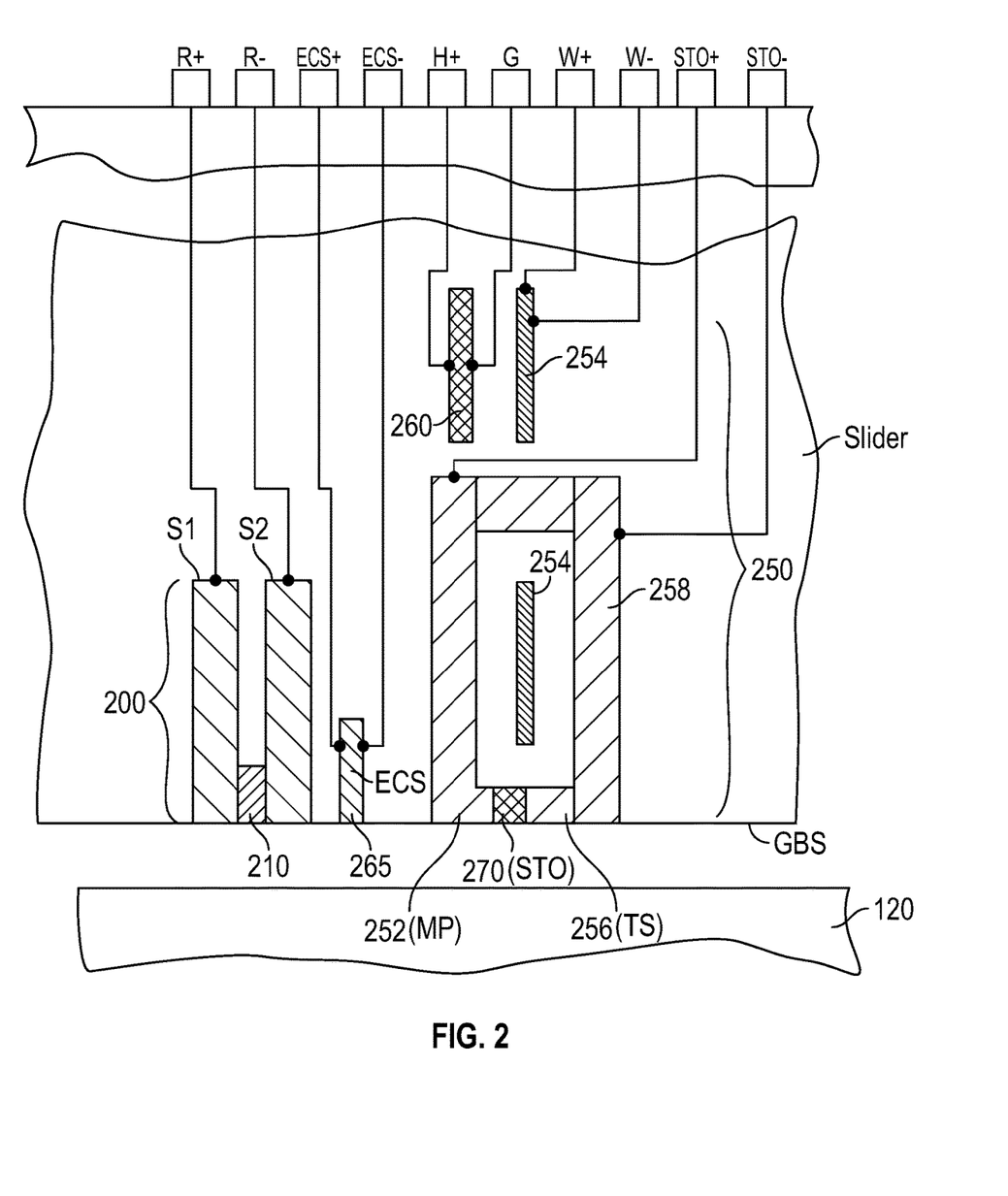
FIG. 2 is a block diagram illustrating a cross-sectional view of the recording medium and the slider and shows a reader, a writer, a heater, an embedded contact sensor and a conductive structure, which may be a spin-torque oscillator (STO), in the write gap of the writer between the main pole and the trailing shield.

FIG. 2 is a block diagram illustrating a cross-sectional view of the recording medium and the slider and shows a reader, a writer, a heater, an embedded contact sensor and a conductive structure, which may be a STO, in the write gap of the writer. Reader 200 comprises a read sensor 210, typically a magnetoresistive sensor, located between two soft magnetic shields S1 and S2, and is connected to contact pads R+, R− on the top of the slider.

Writer 250 comprises a main pole (MP) 252, a writer coil 254, a trailing magnetic shield (TS) 256, and a return pole 258 connected to TS 256. Main pole 252 is exposed at the GBS and faces disk 120. Electric current flowing through the coil 254 produces a magnetic field that emits from the tip of MP 252 and forms recording bits by reversing the magnetization of magnetic regions on the disk 120. The coil 254 is connected to write head contact pads W+, W− on the top of the slider. A return pole 258 is positioned for providing means for the magnetic flux to return from disk 120 to the writer structure to complete the magnetic circuit. The magnetic TS 256 is positioned between the main MP 252 and the return pole 258 for assisting with focusing the magnetic flux emitting from MP 252.

An electrically conductive structure 270, which may be a STO, is located in the write gap between MP 252 and TS 256 and assists in writing. Electrical connection is made to conductive structure 270 from contact pads STO+, STO− on the top of the slider, which are connected to the conductive MP 252 and TS 256, through conductive return pole 258. In the description below, for the sake of simplicity, the electrically conductive structure will be referenced by the example STO implementation. The description is not intended to limit the electrically conductive structure to the STO embodiments.

A heater 260 is controlled by a thermal fly-height control (TFC) device (not shown), which is connected to heater 260 at pads H+, G on the top of the slider. By applying current to the heater 260, the surrounding slider material is caused to expand in response to the heat, which causes a bulge in the slider toward the disk 120, thus reducing the flying height.

An embedded contact sensor (ECS) 265 is a metallic strip located at the GBS and is connected to contact pads ECS+, ECS− on the top of the slider. The resistance of the ECS changes in response to temperature changes and can be used to detect slider-disk contact, when the slider temperature suddenly increases due to frictional heating with the disk 120. During write operations, the heater 260 causes the MP 252, STO 270 and TS 256 to be closer to the disk 120 to thereby enable the written magnetic bits to be placed closer together.

Figure 3:
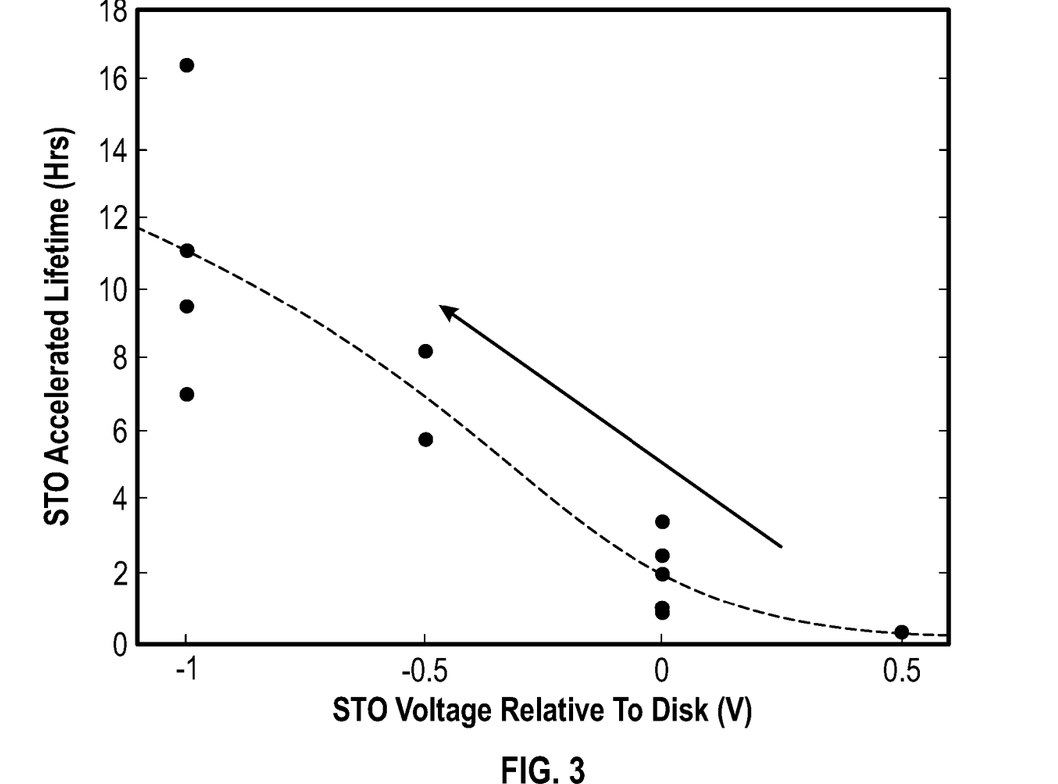
FIG. 3 is a graph showing the accelerated lifetime of a STO as a function of slider-disk interface voltage.

To minimize slider-disk contact and lubrication pick-up from the disk and to improve overall flyability, there should be no electrical potential between the slider body and the disk, which is at ground potential. However, it has been discovered that to minimize oxidation of the STO, which results from degradation of the slider protective overcoat, and thus improve the overall lifetime of the STO, a negative voltage should be applied to the STO relative to the disk. FIG. 3 is a graph showing the accelerated lifetime of a STO as a function of slider-disk interface voltage. Each data point was generated by measuring the time to failure of the STO after a large number of slider touchdowns for a specific voltage between the slider and the disk. The lifetime is greatly improved at negative voltage of the STO relative to the disk. The arrow in FIG. 3 illustrates how STO lifetime is improved as the interface voltage becomes more negative.

Figure 4:
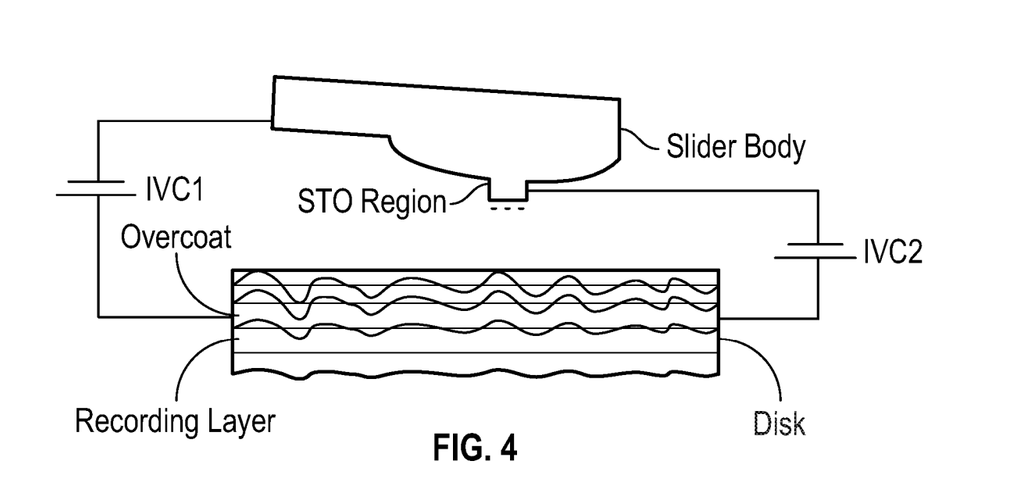
FIG. 4 is a diagram illustrating includes dual independent interface voltage control (IVC) circuitry to provide different bias voltages to the slider body and the STO.

Thus in embodiments of this invention, the HDD includes dual independent interface voltage control (IVC) circuitry to provide different bias voltages to the slider body and the STO. This is illustrated graphically in FIG. 4. First IVC circuitry (IVC1) assures substantially 0V between the slider body and the disk while second IVC circuitry (IVC2) provides a bias voltage to assure a negative voltage between the STO region of the slider and the disk.

Figure 5:
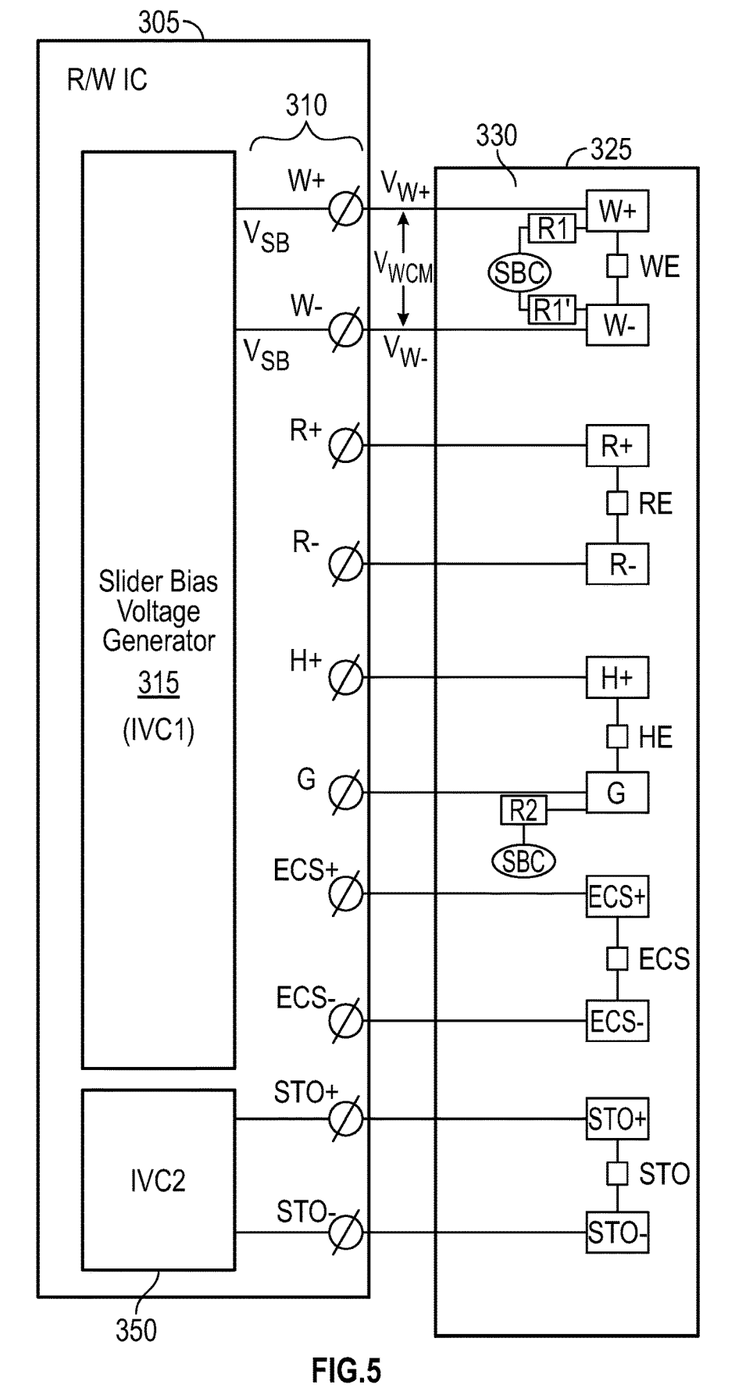
FIG. 5 is block diagram of a slider coupled to dual independent interface voltage control (IVC) systems in a read/write integrated circuit (R/W IC) according to an embodiment of the invention.

FIG. 5 is block diagram of a slider coupled to dual independent interface voltage control (IVC) systems according to an embodiment of the invention. A slider bias voltage generator 315 functions as first interface voltage control circuitry (IVC1) and generates a direct current (DC) bias voltage to an element on the body 330 of slider 325 via an existing signal path, which in FIG. 5 is the write head or writer. Slider bias voltage generator 315 is shown as a portion of read-write integrated circuit (R/W IC) 305. In some embodiments, slider bias voltage generator 315 is located in other portions of HDD 100 (FIG. 100). For example, in other embodiments, slider bias voltage generator 315 may be included as a portion of a printed circuit board attached to HDD base 168 or included in AE module 160 (FIG. 100). By "existing signal path," what is meant is that a conventional existing signal path, such as a read path, write path, heater element control path or ECS path is utilized for coupling the bias voltage to slider body 325. While an existing signal path may be slightly modified, such as through the inclusion of components such as a capacitor, a coupling to a slider body connection, and/or a resistor, a separate special purpose signal path for coupling the slider bias voltage from slider bias voltage generator 315 to slider body 325 is not required. The existing signal path is primarily used for conveying another signal (e.g., a read data signal, write data signal, heater element control signal, or ECS signal) between the slider and electronics external to the slider. However, at least sometimes the other signal and a slider bias voltage are conveyed simultaneously, integrated together with one another, on the same signal path within the slider. Thus, this existing signal path may convey the bias voltage to conductive body 325 in an "integral fashion" along with the other signal that is being conveyed to or from the slider on the same signal path. In embodiments of this invention IVC1 may convey the slider bias voltage via any of the existing signal paths.

In FIG. 5, slider 325 comprises a conductive body 330 and includes a write element (WE), read element (RE), heater element (HE), embedded contact sensor (ECS) and STO. A signal path exists between R/W IC 305 and each of the elements. R/W IC 305 includes a plurality of R/W IC input/outputs (I/Os) 310. The I/Os 310 may comprise pads for electrical connection via existing signal paths to corresponding pads on the top of slider 325, as shown by pads on the top of the slider in FIG. 2. R/W IC input/outputs 310 include: write+(W+) and write− (W−), read+(R+) and read− (R−), heater element control+(H+) and ground (G), ECS+ and ECS−, and STO+ and STO−.

In the example of FIG. 5 wherein IVC1 is coupled to the electrical coil of the write head, slider 325 includes resistive components R1 and R1' which are coupled between a slider body connection (SBC), and each leg of the signal path between the write element and R/W IC 305. This provides a common mode signal path, which couples the slider bias voltage $V_{SB}$ to slider body 325. Additionally, a third resistive element R2 couples the SBC to the ground line G of heater element HE. With this connection scheme, the write driver's common-mode voltage $V_{WCM}$ is equivalent to 0.5 ($V_{w-}$+$V_{w+}$) and can be used to control the potential of slider body 325 relative to the disk.

While FIG. 5 illustrates an embodiment where the existing signal path is the write signal path, the existing signal path can comprise any of the write signal path, the read signal path, the heater element control signal path or the ECS path. While the existing signal path is primarily used for conveying another signal (e.g., a write signal, read signal, heater element control signal) to or from (and through) slider 325, at least sometimes the existing signal path conveys the bias voltage to the conductive body in an integral fashion along with another signal (such as the signal which the existing signal path primarily carries). In some embodiments, the existing signal and/or the bias voltage is applied through a common mode voltage on a pair of signal lines. The IVC1 utilizes a predetermined programmable bias voltage value (typically between about −1.0V and +1.0V) to control the bias voltage generation. The predetermined programmable bias voltage value is selected from a set voltage ranges (values) known to avoid slider-lube pickup or by other methods that accounts for disk voltage and lube variations. In one embodiment, once the bias voltage value is determined and/or selected, well-known circuit methods are utilized to transfer a digital setting to an analog voltage reference, which is then used for generation of the bias voltage. The range of values can be preselected, such as at a factory or laboratory. In one embodiment, the predetermined programmable bias voltage value itself is set or selected in a factory, laboratory, or while a disk drive is in operation. U.S. Pat. No. 8,125,727 B2 and US 2014/0240871 A1, both assigned to the same assignee as this application, describe techniques for determining the bias voltage value to be applied to the slider body. In the preferred method according to an embodiment of the invention, the bias voltage is selected to assure there is substantially no electrical potential (0V) between the slider body and the disk, since it has been discovered that this value results in minimum slider-disk contact and lubrication pickup.

The above-described slider bias voltage generator 315 that functions as the IVC1 in embodiments of this invention is described in detail in U.S. Pat. No. 8,049,984 B2, which is assigned to the same assignee as this invention and is incorporated herein by reference.

FIG. 5 also illustrates a second interface voltage control circuitry (IVC2) 350 coupled to the STO, or other conductive structure, via an existing signal path that provides a signal to the STO. The IVC2 350 provides a bias voltage to the STO to assure a negative potential between the STO and the disk and is separate from and independent of IVC1. Like slider bias voltage generator 315 (IVC1), IVC2 may be located as part of R/W IC 305, on a printed circuit board or as part of the AE module.

Figure 6:
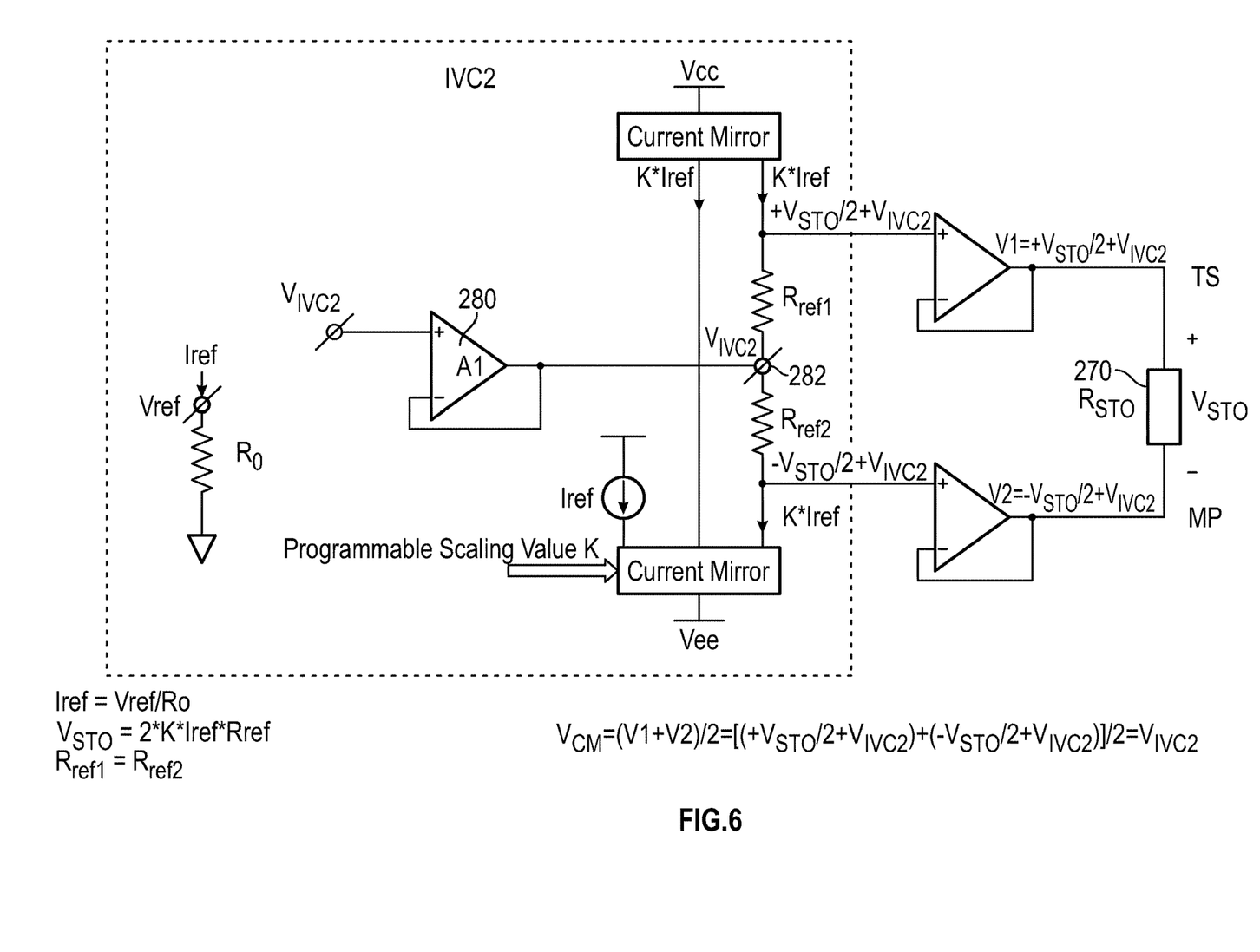
FIG. 6 is a schematic illustrating an embodiment of the operation of the second interface voltage control circuitry (IVC2) connected to the STO between the main pole and trailing shield of the write head.

FIG. 6 is a schematic illustrating an embodiment of the operation of IVC2 connected to the STO. The STO 270 (FIG. 2), or non-STO electrically conductive structure, is located between and electrically connected to the conductive main pole (MP) and trailing shield (TS). An accurate voltage reference ($V_{ref}$) generates a current $I_{ref}$. A current mirror assures a stable and constant current that is directed through resistances $Rr_{ef1}$ and $Rr_{ef2}$, which are of substantially equal value. The value of $I_{ref}$ is set by a programmable scaling factor, K. The voltage $V_{IVC2}$ from voltage follower 280 is applied to the common mode junction 282 and is the common mode voltage $W_{CM}$. As shown by the equations on FIG. 6, the voltage at the TS relative to ground (i.e., the disk) is given by $V1=+V_{STO}/2+V_{IVC2}$ and the voltage at the MP relative to ground is given by $V2=-V_{STO}/2+V_{IVC2}$. Thus in one example for illustrating how IVC2 assures the desired negative potential at the STO region (the TS and MP) relative to the disk, assume the STO voltage $V_{STO}$ is 100 mV. If $V_{IVC2}$ is set at −500 mV, then this results in V1 at the TS being −450 mV and V2 at the MP being −550 mV.

Like IVC1, the IVC2 utilizes a predetermined programmable bias voltage value $V_{ivo}$, to control the bias voltage generation. The predetermined programmable bias voltage value is selected from a set voltage ranges (values) known to assure negative electrical potential at the STO region. In one embodiment, once the bias voltage value is determined and/or selected, well-known circuit methods are utilized to transfer a digital setting to an analog voltage reference, which is then used for generation of the bias voltage. The range of values can be preselected, such as at a factory or laboratory. In one embodiment, the predetermined programmable bias voltage value itself is set or selected in a factory, laboratory, or while a disk drive is in operation, typically based on a calibration technique that involves measuring the slider flying height at different common mode voltages.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A hard disk drive (HDD) comprising:
   a rotatable magnetic recording disk;
   a gas-bearing slider maintained over the surface of the disk when the disk is rotating;
   a write head on the slider comprising an electrically conductive main pole and an electrically conductive trailing shield;
   an electrically conductive structure between the main pole and the trailing shield; and
   interface voltage control circuitry coupled to the electrically conductive structure, the interface voltage control circuitry being adapted to provide a negative electrical potential at the main pole and trailing shield relative to the disk.

2. The HDD of claim 1 wherein the electrically conductive structure is a spin-torque oscillator (STO).

3. The HDD of claim 1 wherein the interface voltage control circuitry is adapted to apply a common mode voltage to the electrically conductive structure.

4. The HDD of claim 3 wherein the interface voltage control circuitry comprises a voltage source for generating a reference current through a pair of resistors having substantially equal resistance values, and wherein the interface voltage control circuitry is adapted to apply said common mode voltage between the two resistors of said pair.

5. The HDD of claim 1 wherein the interface voltage control circuitry is adapted to provide a programmable voltage.

6. The HDD of claim 1 wherein the interface voltage control circuitry coupled to the electrically conductive structure is a second interface voltage control circuitry (IVC2) and further comprising a first interface voltage control circuitry (IVC1) electrically coupled to the body of the slider and adapted to assure substantially zero electrical potential between the slider body and the disk.

7. The HDD of claim 6 wherein the slider further comprises a coil coupled to the write head, a read head, a heater and an embedded contact sensor (ECS), and wherein the IVC1 is electrically coupled to one of said coil, read head, heater and ECS.

8. The HDD of claim 7 wherein the IVC1 is electrically coupled to the ECS and is adapted to apply a common mode voltage to the ECS.

9. A hard disk drive (HDD) comprising:
   a rotatable magnetic recording disk;
   a gas-bearing slider maintained over the surface of the disk when the disk is rotating;
   a write head on the slider comprising an electrical coil for generating a write current, an electrically conductive main pole, an electrically conductive trailing shield and an electrically conductive structure between the main pole and the trailing shield;
   a read head on the slider;
   a heater on the slider;
   an embedded contact sensor (ECS) on the slider;
   a first interface voltage control circuitry (IVC1) electrically coupled to one of said coil, read head, heater and ECS, the IVC1 being adapted to provide substantially zero electrical potential between the slider and the disk; and second interface voltage control circuitry (IVC2) coupled to the electrically conductive structure through the main pole and trailing shield, the interface voltage control circuitry being adapted to provide a negative electrical potential at the main pole and trailing shield relative to the disk.

10. The HDD of claim 9 wherein the electrically conductive structure is a spin-torque oscillator (STO).

11. The HDD of claim 9 wherein the IVC2 is adapted to apply a common mode voltage to the electrically conductive structure.

12. The HDD of claim 11 wherein the IVC2 comprises a voltage source for generating a reference current through a pair of resistors having substantially equal resistance values, and wherein the IVC2 is adapted to apply said common mode voltage between the two resistors of said pair.

13. The HDD of claim 9 wherein each of the IVC1 and IVC2 is adapted to provide a programmable voltage.

14. The HDD of claim 9 wherein the IVC1 is electrically coupled to the ECS and adapted to apply a common mode voltage to the ECS.

\* \* \* \* \*